United States Patent [19]

Iacoviello

[11] Patent Number: 4,673,702

[45] Date of Patent: Jun. 16, 1987

[54] STABLE EMULSIONS OF WATER RESISTANT POLYVINYL ALCOHOL-STABILIZED VINYL CHLORIDE-ETHYLENE COPOLYMERS

[75] Inventor: John G. Iacoviello, Allentown, Pa.

[73] Assignee: Air Products and Chemicals, Inc., Allentown, Pa.

[21] Appl. No.: 747,133

[22] Filed: Jun. 20, 1985

Related U.S. Application Data

[63] Continuation-in-part of Ser. No. 572,726, Jan. 20, 1984, abandoned.

[51] Int. Cl.$^4$ ............................ C08F 2/16; C08K 3/20
[52] U.S. Cl. .................................... 524/459; 524/461; 524/834
[58] Field of Search ...................... 524/459, 461, 834

[56] References Cited

U.S. PATENT DOCUMENTS

| | | | |
|---|---|---|---|
| 2,771,457 | 11/1956 | Barnes et al. ...................... | 524/834 |
| 2,843,562 | 7/1958 | Caldwell ........................... | 260/45.5 |
| 3,399,157 | 8/1968 | Deex et al. ........................ | 260/29.6 |
| 3,501,440 | 3/1970 | Kamio et al. ...................... | 260/77.5 |
| 3,642,740 | 2/1972 | Pierce, Jr. et al. ................ | 260/87.5 |
| 3,689,447 | 9/1972 | Makower et al. .............. | 260/29.6 B |
| 3,725,367 | 4/1973 | Kemp ............................... | 260/80.81 |
| 3,736,303 | 5/1973 | Smith et al. ...................... | 260/79.3 |
| 3,830,761 | 8/1974 | Lenney ............................. | 524/834 |
| 3,875,130 | 4/1975 | Kemp ............................... | 260/87.1 |
| 3,895,167 | 7/1975 | Gor .................................. | 525/160 |
| 4,133,791 | 1/1979 | Kemenater et al. . | |
| 4,150,210 | 4/1979 | Anderson et al. ................. | 526/222 |
| 4,189,415 | 2/1980 | Eck et al. . | |
| 4,331,577 | 5/1982 | Hanna ............................... | 524/819 |
| 4,528,315 | 7/1985 | Eck et al. .......................... | 524/733 |

FOREIGN PATENT DOCUMENTS

| | | | |
|---|---|---|---|
| 5126988 | 3/1976 | Japan ................................. | 524/834 |
| 55-157608 | 12/1980 | Japan ................................. | 524/834 |
| 889645 | 2/1962 | United Kingdom ............... | 524/834 |
| 991536 | 5/1965 | United Kingdom ............... | 524/834 |
| 1043630 | 9/1966 | United Kingdom ............... | 524/834 |

*Primary Examiner*—Paul R. Michl
*Assistant Examiner*—N. Sarofim
*Attorney, Agent, or Firm*—Michael Leach; James C. Simmons; E. Eugene Innis

[57] ABSTRACT

A method for preparing a stable vinyl chloride based resin emulsion which comprises a copolymer colloidally dispersed in an aqueous medium, the copolymer having a Tg from 0° to 50° C., about 65 to 90 wt% vinyl chloride, about 5 to 35 wt% ethylene, 0 to 10 wt% olefinically unsaturated copolymerizable monomer and prepared by emulsion polymerization of vinyl chloride, ethylene and, optionally, an olefinically unsaturated comonomer in the presence of about 3 to 15 wt% polyvinyl alcohol as the dispersing agent, the polymerization method comprising (a) forming an aqueous emulsion reaction mixture containing substantially all the polyvinyl alcohol and a portion, preferably at least 5%, of the total vinyl chloride monomer, (b) pressurizing the reaction mixture with an ethylene pressure sufficient to provide the copolymer with a 5 to 35 wt% ethylene content, (c) initiating the reaction mixture by the addition of a free radical generating source and continuing polymerization until the rate of polymerization begins to decrease to provide a prepolymer emulsion, and (d) adding the remaining vinyl chloride at a substantially uniform rate and continuing polymerization until the polymerization reaction is no longer self-sustaining, ethylene being neither withdrawn nor added during the polymerization in one embodiment.

16 Claims, No Drawings

STABLE EMULSIONS OF WATER RESISTANT POLYVINYL ALCOHOL-STABILIZED VINYL CHLORIDE-ETHYLENE COPOLYMERS

CROSS-REFERENCE TO RELATED APPLICATIONS

The present application is a continuation-in-part application of application Ser. No. 572,726 filed Jan. 20, 1984, now abandoned.

TECHNICAL FIELD

The present invention relates to vinyl chloride-ethylene copolymer emulsions and polymer coatings deposited from such emulsions.

BACKGROUND OF THE INVENTION

Emulsion polymerization processes employing polyvinyl alcohol or celluloses such as hydroxyethyl cellulose as the emulsifier, or protective colloid, yield emulsion polymer products widely used as adhesives, binders and coatings. Such products have historically been known to possess poor resistance to water, generally manifested as a loss of adhesive strength to the substrate on exposure to water or as an unattractive whitening characteristically known as "blushing". This poor water resistance property has inhibited the use of such polymers prepared in the presence of polyvinyl alcohol or celluloses as coatings coming in contact with water, for example, as interior can coatings.

To overcome this water sensitivity, crosslinking agents have been added to react with the polyvinyl alcohol of the polymer coating to render it water insoluble. However, such coatings still demonstrate the unattractive blushing on exposure to water. U.S. Pat. No. 2,843,562 attempts to overcome the water sensitivity of graft copolymers of polyvinyl alcohol and vinyl chloride by incorporating a small amount of a cross-linking monomer containing at least two olefinic unsaturations.

The inventor is aware that polymer emulsions which can deposit a polymer coating that has enhanced water resistance can be prepared by the aqueous emulsion polymerization of at least one ethylenically unsaturated monomer in a salt-free aqueous medium. The salt-free aqueous medium comprises a polyvinyl alcohol as the protective colloid and a redox system comprising hydrogen peroxide or an organic peroxy compound as the oxidant and an organic reductant. When this technology was applied to the preparation of vinyl chloride-ethylene copolymer emulsions using typical polymerization techniques including polyvinyl alcohol levels of 3 to 10 wt%, stable copolymer emulsions were not readily obtained. Another difficulty encountered is related to the solubility of the ethylene in that the ethylene pressure may rise uncontrollably during the polymerization reaction.

U.S. Pat. No. 3,399,157 teaches improving the stability of ethylene/vinyl chloride latexes by adding only a portion of the desired amount of emulsifying agent to the reaction mixture prior to the initiation of polymerization and adding a second portion to the reaction mixture after the polymerization is completed.

U.S. Pat. No. 3,501,440 discloses in Example 5 and reference Examples 5-6 the use of polyvinyl alcohol as the protective colloid in the copolymerization of ethylene with vinyl chloride at a reaction temperature between the critical temperature of ethylene and 60° C. and at an ethylene pressure which is maintained substantially constant by withdrawing excess ethylene out of the reaction vessel during the polymerization.

U.S. Pat. No. 3,642,740 discloses that vinyl chloride homo- and copolymers can be prepared in aqueous emulsion using as the emulsifier system an alkali metal salt of a sulfated $C_8$-$C_{18}$ fatty alcohol, a tallow fatty alcohol or an epoxidized unsaturated fatty acid oil, and a complex organic phosphate ester or salt derivative. Example 1 shows that the emulsion used in preparing the molding paste resin product involves the preparation of a polymer seed latex.

U.S. Pat. No. 3,689,447 discloses that heat resistant copolymers of ethylene and vinyl chloride can be prepared by the use of a seed latex in the aqueous composition for emulsion polymerization, together with heat-activated initiation at between about 50° and 85° C. by water-soluble persulfates or peroxydiphosphates. The seed latex can be prepared by the emulsion polymerization of any polymerizable ethylenically unsaturated compound. The seed latex can be prepared beforehand in a separate vessel and a desired aliquot can then be introduced into the aqueous composition. Alternatively, the seed latex can be made in situ in all or part of the aqueous composition before the reactor is pressurized with ethylene.

U.S. Pat. No. 3,725,367 describes a process for the preparation of polymers and copolymers having a vinyl base which comprises dispersing into the organic vinyl based monomeric system a seeding latex containing an excess amount of organo-soluble catalyst such that the seeding latex forms the dispersed phase and the organic monomeric system the continuous phase.

U.S. Pat. No. 3,736,303 discloses a latex composition comprising a copolymer of vinylidene chloride, an ethylenically unsaturated sulfur acid having sulfur in a valent state of 6, optionally an ethylenically unsaturated carboxylic acid and another ethylenically unsaturated monomer prepared using a seed latex, an ascorbic acid-hydrogen peroxide redox system, and ionic buffers and surfactants.

U.S. Pat. No. 3,875,130 discloses the preparation of homo- and copolymers of vinyl chloride in which the polymerization of the monomer composition is carried out in the presence of a seeding product prepared by the polymerization in emulsion or fine suspension.

U.S. Pat. No. 4,150,210 discloses a one-step process for the emulsion polymerization of vinyl chloride and, optionally, comonomers using a water-soluble initiator or initiator system and a mixed emulsifier of (1) a $C_{12}$-$C_{18}$ straight chain alkyl or alkenyl surfactant; (2) a $C_{14}$-$C_{20}$ straight chain alkyl or alkenyl alcohol; and (3) a $C_5$-$C_8$ straight alkyl chain sulfosuccinate emulsifier. The examples show the use of a hydrogen peroxide-ascorbic acid redox system.

U.S. Pat. No. 4,189,415 discloses aqueous vinyl chloride-vinyl acetate-ethylene copolymer dispersions containing only polyvinyl alcohol as the protective colloid. All of the polyvinyl alcohol or only part of it can be introduced at the beginning, the ethylene pressure applied is kept constant and the polymerization temperature is 10°-85° C., preferably 20°-50° C.

U.S. Pat. No. 4,331,577 discloses a method for preparing ethylene-containing copolymer emulsions by the selective addition of the monomers mixture to the reactor in response to pressure variation and the maintenance of a monomer unsaturated condition in the reactor.

SUMMARY OF THE INVENTION

The present invention provides stable polyvinyl alcohol/vinyl chloride-ethylene copolymer emulsions which can deposit a polyvinyl alcohol-containing polymeric coating on a substrate that demonstrates surprisingly enhanced water resistance and adhesion to the substrate.

The stable resin emulsion comprises from 20 to 70 wt%, especially about 40 to 60 wt%, of a copolymer colloidally dispersed in an aqueous medium, the copolymer comprising about 65 to 90 wt% vinyl chloride, about 5 to 35 wt% ethylene, and 0 to about 10 wt% olefinically unsaturated copolymerizable monomer and having a Tg from about 0° to 50° C. The copolymer is prepared by emulsion polymerization, preferably in a substantially salt-free aqueous medium, in the presence of about 3 to 15 wt% polyvinyl alcohol which is 70 to 91 mole % hydrolyzed as the dispersing, or emulsifying agent. The wt% values are based on monomers incorporated into the copolymer.

With regard to the invention, "salt-free" means the substantial absence of ionic materials, that is to say the presence of ionic materials at less than about 0.1 wt% based on solids. Accordingly, the free radical generating source for initiating and sustaining the polymerization process would be a redox system comprising hydrogen peroxide or an organic peroxy compound as the oxidant and an organic reductant.

According to the invention the polymerization process comprises (a) forming an aqueous emulsion reaction mixture containing substantially all the polyvinyl alcohol and a portion, preferably at least 5%, of the total vinyl chloride monomer, (b) pressurizing the reaction mixture with an ethylene pressure sufficient to provide the copolymer with about 5 to 35% ethylene content, (c) initiating the reaction mixture by the addition of a free radical forming source and continuing polymerization until the rate of polymerization begins to decrease, (d) adding the remaining vinyl chloride, preferably at a substantially uniform rate over a period of time, while continuing polymerization until the reaction is no longer self sustaining, and (e) removing the unreacted ethylene and reducing the vinyl chloride free monomer content, preferably to less than 10 ppm.

Particular embodiments of the invention in addition to the resin emulsions, are a metl container, such as a metal can, coated with a polymeric film deposited from the polyvinyl alcohol-stabilized vinyl chloride-ethylene copolymer emulsions and metal container coating formulations containing such emulsions and crosslinking agents or resins.

As an advantage of the invention, the emulsion polymerization process provides polyvinyl alcohol-stabilized vinyl chloride-ethylene copolymer emulsions possessing enhanced stability compared to copolymers prepared using conventional copolymerization techniques.

As another advantage the vinyl chloride-ethylene copolymer emulsions deposit polymeric films of dramatically improved water resistance, especially if prepared in a salt-free medium. It is not necessary to use crosslinking agents to provide a high degree of water resistance although such agents can be used. In addition, compared to standard vinyl chloride-ethylene products the copolymers of this invention show improved dry film tensile hardness and improved adhesion to various substrates including wood, glass and metals such as steel and aluminum.

DETAILED DESCRIPTION OF THE INVENTION

The vinyl chloride-ethylene copolymers of the stable emulsions according to the invention contain about 65 to 90 wt% vinyl chloride, preferably about 75 to 80 wt%. The copolymerization reaction is performed under an ethylene pressure which is sufficient to provide the copolymer with about 5 to 35 wt% ethylene content, preferably about 20 to 25 wt%. Pressures of about 50 to 100 atm are generally used to afford such ethylene content. When the vinyl chloride content is less than about 65 wt%, the requisite ethylene pressures are difficult to handle and at greater than about 90 wt% vinyl chloride stability becomes a problem.

The vinyl chloride-ethylene copolymers may also contain up to about 10 wt%, preferably about 1 to less than 5 wt%, of other olefinically unsaturated monomers copolymerizable with vinyl chloride and ethylene. By way of illustration, other suitable olefinically unsaturated co-monomers for making the stable copolymer emulsions and water resistant copolymers of the invention include vinyl esters of $C_1$–$C_{12}$ alkanoic acids, such as vinyl formate, vinyl propionate, and especially vinyl acetate; $C_3$–$C_{10}$ alkenoic acids, such as acrylic acid and methacrylic acid, and alpha,beta-unsaturated $C_4$–$C_{10}$ alkanoic acids, such as crotonic acid, isocrotonic acid, and their esters with $C_1$–$C_{18}$ alkanols such as methanol, ethanol, propanol and butanol, as well as 2-ethylhexyl alcohol, cyclohexyl alcohol and lauryl alcohol; vinylidene halides, such as vinylidene chloride; styrene; alpha,beta-unsaturated $C_4$–$C_{10}$ alkenedioic acids such as maleic acid, fumaric acid and itaconic acid and their monoesters and diesters of $C_1$–$C_{18}$ alkanols; and nitrogen containing monoolefinically unsaturated monomers, particularly nitrides, amides, N-methylol amides, lower alkanoic acid esters of N-methylol amides, lower alkyl ethers of N-methylol amides and allyl carbamates, such as acrylonitrile, acrylamide, methacrylamide, N-methylolacrylamide, N-methylol methacrylamide, N-methylol allyl carbamate or N-methylol lower alkyl ethers or N-methylol lower alkanoic acid esters of N-methylolacrylamide, N-methylol methacrylamide and N-methylol allyl carbamate such as N-isobutoxymethylacrylamide. The preferred comonomers for the vinyl chloride-ethylene polymers are the $C_3$–$C_{10}$ alkenoic acids and nitrogen-containing monomers, such as acrylic acid, acrylamide, N-methylolacrylamide and N-isobutoxymethylacrylamide, preferably in about 1 to 5 wt%.

The dispersing agent, or protective colloid, used in preparing the stable emulsions is at least one polyvinyl alcohol. A single polyvinyl alcohol may be used alone or mixtures of different polyvinyl alcohols can be used.

The amount of polyvinyl alcohol used in the polymerization reaction is about 3 to 15 wt%, preferably 4 to 10 wt%, based on monomers, substantially all of which is added initially to the aqueous medium, i.e. prior to initiation of polymerization. Less than about 3 wt% polyvinyl alcohol is unsuitable for providing stable copolymer emulsions because of emulsion coagulum while greater than 15% polyvinyl alcohol is generally unsuitable because of high viscosity at commercially acceptable solids.

Additional amounts of polyvinyl alcohol can be added to the reaction mixture during polymerization provided that at least about 3 wt%, preferably at least about 4 wt%, polyvinyl alcohol is present in the reaction mixture upon initiation.

The polyvinyl alcohols which are suitable for use in the invention are, in general, 70 to 91 mole% hydrolyzed, preferably 85 to 89 mole% hydrolyzed, and most preferably 87 to 89 mole% hydrolyzed, and have a degree of polymerization ($DP_n$) ranging from 200 to 4,000, preferably 500 to 2,500. A polyvinyl alcohol having a $DP_n$ at the lower end of the range, e.g. from 200 to about 400, should be used in combination with a polyvinyl alcohol having a higher $DP_n$ of about 500 or more. For example, Vinol® 203 polyvinyl alcohol ($DP_n$ about 250) when used alone did not afford a stable product, but in a 1:2 weight ratio with Vinol 205 polyvinyl alcohol ($DP_n$ about 550) stable emulsions were readily obtained if the Vinol 203 polyvinyl alcohol was added during the polymerization reaction (delay addition).

For polymerization recipes containing up to about 8 wt% polyvinyl alcohol, a polyvinyl alcohol resin having a degree of polymerization of less than about 2500 should be used, and at about 8 to 15 wt% a polyvinyl alcohol of less than about 1000 degree of polymerization should be used.

The water solubility of polyvinyl alcohols which are less than 70 mole% hydrolyzed has diminished to the point where it adversely affects emulsion polymerization.

It has also been discovered that the use of fully hydrolyzed polyvinyl alcohols, i.e. 98 to 99+ mole% hydrolyzed, in combination with a partially hydrolyzed polyvinyl alcohol in a 1:1 weight ratio did not afford stable emulsions. It should be possible to use a stabilizing system comprising predominantly a partially hydrolyzed polyvinyl alcohol and a minor amount of a fully hydrolyzed polyvinyl alcohol and it is believed that such stabilizing system should contain at least about 75 wt% partially hydrolyzed polyvinyl alcohol. In other words, it is believed that when such a stabilizing system contains more than 25 wt% fully hydrolyzed polyvinyl alcohol, gritty unsuitable polyvinyl alcohol/vinyl chloride-ethylene products will result. Solely using a fully hydrolyzed polyvinyl alcohol would yield a suspension resin.

Other protective colloids, such as the celluloses or hydroxyalkyl celluloses, or typical emulsifying agents such as ionic or nonionic surfactants in combination with the polyvinyl alcohol may be used in amounts up to about equal proportions, preferably less than 50%, based on weight of polyvinyl alcohol, although water resistance may be impaired.

Free radical sources, for example redox systems, used in the practice of this invention are conventional and used in conventional amounts. The polymerization is generally performed with quantities of redox system ranging from 0.03 to 3 wt% based on monomers. Typically, the entire quantity of either the oxidant or reductant component of the redox system, or a substantial portion, is introduced at the beginning and polymerization is initiated and controlled by metering in the other component. Obviously, the polymerization may be controlled by the simultaneous metering in of both components. Examples of the oxidizing component are ammonium persulfate, potassium persulfate, hydrogen peroxide and t-butyl hydroperoxide. Examples of the reducing component are sodium sulfite, sodium metabisulfite and zinc or sodium formaldehyde sulfoxylate.

Although the use of such conventional redox systems affords stable emulsions and vinyl chloride-ethylene copolymer coatings having improved water resistance, adhesion and tensile hardness, the resistance to water can be further enhanced by polymerization in a salt-free aqueous environment. Accordingly, the redox system must be salt-free, that is to say, nonionic as far as the oxidant and reductant are concerned.

For the salt-free system suitable oxidizing agents, or initiators, include hydrogen peroxide and organic peroxy compounds. Illustrative of the organic peroxides that can be used are alkylhydroperoxides such as t-butyl hydroperoxide, dialkyl peroxides such as di-t-butyl peroxide, peroxy acids such as peracetic acid and perbenzoic acid, diacyl peroxides such as diacetyl peroxide and dilauroyl peroxide, and peroxy esters such as t-butyl peracetate and t-butyl perbenzoate. The preferred oxidant for use in the invention is hydrogen peroxide.

The reductant component of the redox system used in the practice of the invention is a nonionic organic material such as a reducing sugar or other easily oxidizable polyhydroxy compound. Compounds frequently employed in this capacity are glucose, levulose, sorbose, invert sugar, ascorbic acid and its enantiomer erythorbic acid which are the preferred reductants, citric acid and the like. Other useful organic reductants include hydroxyl amines, thiols, pentamines and tartaric acid.

The preferred redox catalyst system for making stable vinyl chloride-ethylene copolymer emulsions comprises hydrogen peroxide and ascorbic acid or erythorbic acid.

The oxidizing agent is generally employed in an amount from about 0.01 to 1.0%, preferably 0.05 to 0.5%, based on the weight of monomers introduced into the polymerization system. The reductant is ordinarily added in an aqueous solution in the necessary equivalent amount. It is important that a reductant be present in the polymerization recipe because the oxidant, in most cases, does not furnish free radicals rapidly enough at temperatures below about 80° C. to expeditiously effect polymerization of the monomers.

The salt-free redox catalyst system may contain promoters such as ferrous sulfate in typically minor amounts. Such minor amounts of ionic materials would not adversely affect the water resistance of the emulsion polymers.

Needless to say, the requirement of a salt-free aqueous medium rules out the use of ionic buffering agents as is so often used in many polymerization recipes for maintaining a particular pH range. However, it has been found that buffers are not required to make the emulsions whether or not salt-free conditions are used. Buffers may thus be used if desired.

A key to providing the stable vinyl chloride-ethylene copolymer emulsions of the invention is the particular emulsion polymerization procedure employed. The reaction temperature of the polymerization can be controlled by the rate of free radical source addition and by the rate of the heat removal. Generally, it is advantageous to maintain a mean temperature of about 55° C. during the polymerization of the monomers and to avoid temperatures much in excess of 80° C. While temperatures as low as 0° can be used, economically the lower temperature limit is about 30° C.

The reaction time will vary depending upon other variables such as the temperature, free radical source, and the desired rate of the polymerization and reactor heat removal capacity. It is generally desirable to continue the reaction until the heat generation due to polymerization has subsided, i.e. the polymerization reaction is no longer self-sustaining.

In carrying out the polymerization, substantially all the polyvinyl alcohol and a portion of the vinyl chloride is initially charged to the polymerization vessel which is then pressurized with ethylene. Most advantageously, at least about 5% of the total vinyl chloride to be polymerized is initially charged, preferably at least about 15%. The remainder of the vinyl chloride is added, desirably at a substantially uniform rate, during the course of the polymerization after the initially charged vinyl chloride monomer content has been substantially reduced, as evidenced by a decrease in the rate of polymerization, to avoid overpressurization of the reactor. No more than about 60% of the vinyl chloride should be charged initially since it is necessary to generate a prepolymer in situ in order to obtain the stable emulsions.

The quantity of ethylene entering into the copolymer is influenced by the pressure, the mixing, and the addition rate and amount of free radical generating source. Thus, to increase the ethylene content of the copolymer higher pressures, greater mixing and higher free radical source rate and amount are employed.

By way of example, at a polymerization temperature of about 55° C. an ethylene pressure in the range of 750 psig to 1000 psig is required to provide a copolymer with about 20–30 wt% ethylene. Above about 1000 psig an undesirable pressure rise occurs while an ethylene pressure below 750 psig yields an unstable emulsion product. It appears that certain amounts of ethylene are needed to be polymerized with the initial vinyl chloride charge to yield a stable emulsion. Needless to say, the 750 to 1000 psig ethylene pressure range for 55° C. polymerization would vary with the reaction temperature employed. Higher pressures can be used in suitable pressure reactors.

The process of forming the vinyl chloride-ethylene copolymer emulsions generally comprises the preparation of an aqueous solution containing substantially all the polyvinyl alcohol dispersing agent. This aqueous solution and the initial charge of vinyl chloride are added to the polymerization vessel and ethylene pressure is applied to the desired value. As previously mentioned, the mixture is thoroughly mixed to dissolve ethylene in the vinyl chloride and in the water phase. Conveniently, the charge is brought to polymerization temperature during this mixing period. Mixing can be effected by shaking, by means of an agitator or other known mechanism.

The polymerization is then initiated by introducing initial amounts of a free radical generating source. For example, either the oxidant or reductant component of a redox system could be initially added to the aqueous medium with the polyvinyl alcohol and vinyl chloride with the other redox component subsequently added to initiate the reaction. With the commencement of initiation, the addition of any third monomer, i.e. olefinically unsaturated copolymerizable monomer, is also begun incrementally. After polymerization has started, delay addition of the free radical generating source is used to continue polymerization until the prepolymer reaction is essentially completed as evidenced by a reduction in the rate of the polymerization. As is well known in the art the rate of polymerization can be followed by plotting the temperature different ($\Delta T$) between the reaction mixture and the reaction vessel jacket. The point at which $\Delta T$ begins to decrease corresponds to a reduction in the rate of polymerization. At this point, the remaining vinyl chloride is incrementally added along with additional free radical generating source and the remaining olefinically unsaturated monomer as delays to continue the polymerization. By "delay" addition is meant the addition of a component in a continuous or intermittent and, preferably, a substantially uniform rate.

When preparing a vinyl chloride copolymer having a Tg of about 20° to 50° C., the ethylene pressure during the polymerization reaction is neither decreased by venting nor maintained at a substantially steady pressure by the addition of make-up ethylene for that consumed, i.e. ethylene being neither withdrawn nor added during polymerization. Rather the ethylene pressure is permitted to increase, decrease or remain constant, i.e. float, and eventually to reduce gradually as ethylene in the sealed polymerization vessel is copolymerized. Once the requisite ethylene pressure is set in the reactor, it will rise for a short period of time with initiation of polymerization as the vinyl chloride in which it is soluble is reacted to give the polymer in which it is less soluble. After the initially charged vinyl chloride has been reacted and the vinyl chloride delay begun, the pressure essentially stabilizes over the remaining polymerization period and eventually decays. This procedure avoids uncontrollable ethylene pressure rises.

For preparing copolymers having a Tg of about 0° to 20° C., make-up ethylene may be used in suitable pressure reactors. Make-up ethylene is usually that amount needed to maintain the initial pressure. It is preferred to make such copolymers (Tg=0°–20° C.) by increasing the initial vinyl chloride monomer charge and increasing ethylene pressure, for example to 1000 psig.

As mentioned, the reaction is generally continued until the polymerization reaction is no longer self-sustaining, desirably until the residual vinyl chloride content is below 0.5%. The completed reaction product is removed from the presence of ethylene and then maintained at a temperature above the Tg of copolymer while sealed from the atmosphere. The reaction mixture can also be transferred to a degasser with removal of ethylene. The unreacted vinyl chloride monomer content is reduced by its reaction with a vinyl acetate addition.

Another method for producing the vinyl chloride-ethylene copolymers comprises first forming an aqueous emulsion of vinyl chloride and the polyvinyl alcohol stabilizing agent. The reactor is pressurized with ethylene and the resulting reaction mixture is adjusted to a temperature from about 10° to 30° C. Polymerization is initiated by the addition of a free radical source at a rate such that the reaction mixture is brought to a temperature from 45° to 85° C., preferably 50° to 60° C., within a period of 1 hour or less, preferably 30 minutes. The polymerization is continued until the rate of the polymerization begins to reduce. The major portion of the vinyl chloride is then added to the reaction vessel as a delay.

Although the water resistance of the vinyl chloride-ethylene copolymer emulsions of this invention is surprisingly enhanced and unexpected since polyvinyl alcohol is present as the stabilizing agent, the water resistance can be further increased by crosslinking the hydroxyl sites on the polyvinyl alcohol polymer, which is believed to be incorporated into the copolymer, with crosslinking agents. There are many known agents for crosslinking polyvinyl alcohol and these include formaldehyde and other aldehydes, in particular dialdehydes such as glutaraldehyde and glyoxal; dimethylol urea, tetrabutyl titanate, bis-3-methoxy propylidene, pentaerythritol; diazonium and tetrazonium salts, boric acid. Polyvinyl alcohol may also be crosslinked by radiation. Other agents which might be used are those known to crosslink cellulose, for example N-methylol and N-methylol ether derivatives of amines, amides and ureas, such as dimethylol dihydroxy ethylene urea and ethyl-N,N-dimethylol carbamate; diepoxides such as diglycidyl ether; ethyleneamine derivatives; divinyl sulphone and bis-(2-hydroxyethyl)sulphone; epichlorohydrin; phosgene and diacid-dichlorides; and 4,5-dihydroxy-1,3-dimethyl-2-imidazolidinone.

Such crosslinking agents typically are added to the polymer emulsion just prior to the coating step in a 1 to 10 wt% range, based on emulsion solids. Acid catalysts such as phosphoric acid, hydrochloric acid, p-toluenesulfonic acid, and oxalic acid are often added to catalyze the crosslinking reaction upon heating of the polymer films or coatings.

The polyvinyl alcohol-stabilized vinyl chloride-ethylene copolymer emulsions may be used to prepare container coating formulations which, when applied to a metal substrate and cured, provide a polymer coating possessing surprising and enhanced water resistance. Such container coating formulations generally involve admixing the copolymer emulsions with crosslinking resins, coalescing agents and acid components well known in the metal container coating art such as melamine formaldehydes, epoxies, dialdehydes, amines, diols, acid catalysts and organic co-solvents. A general can coating formulation would comprise (a) about 45 to 95 wt% copolymer emulsion, (b) about 5 to 40 wt% crosslinking resin, based on solids, (c) up to 10 wt% organic cosolvent (coalescing agent) and, optionally, (d) up to 5 wt% acid catalyst. An illustrative container coating formulation would be a vinyl chloride-ethylene copolymer emulsion according to the invention and Cymel 303 melamine formaldehyde, 90/10 wt%, 40 wt% solids in water/diethylene glycol monoethylether acetate (90/10 wt%). These formulations are then applied to metal substrates such as steel or aluminum by spraying, dipping, roll coating or other application methods well known in the can coating art and cured by heating.

The following examples are provided to illustrate the invention and are not intended to restrict the scope thereof. Test procedures used in evaluating the vinyl chloride copolymer resins for can coatings:

Blushing: Blushing (film whitening) is observed immediately following removal of coated aluminum panel from test solution and rated using the following scale:
  Rating scale 10-0 (10 excellent or not change)
    10 = No Blush
    8 = Faint Blush
    6 = Moderate Blush
    4 = Definite
    2 = Very White
    0 = Terrible, Film Lifts
Impact Resistance: ASTM D2794-69
Pencil Hardness: ASTM D 3363-74
Metal Adhesion: ASTM D 3359-78 using Ericsen Type 295 Adhesion tester MEK Resistance: A cotton swab saturated with MEK is rubbed back and forth across coated panel until coating is removed or until 100 rubs is reached. One back and forward movement across test panel constitutes one rub,

EXAMPLE 1

The polymerization of various vinyl chloride-ethylene copolymer emulsions of Runs 1-26 was carried out in a pressure vessel equipped with a jacket and an agitation system involving turbine blades.

In preparing the copolymer emulsion of Run 1 the following initial charge was introduced into the reaction vessel:

| INITIAL CHARGE | |
|---|---|
| Distilled water | 555 g |
| Ferrous ammonium sulfate | 0.9 g |
| Sequestrine 30A[a] | 2.7 g |
| Vinol ® 205[b] PVOH (12% solution) | 854 g |

[a]Ethylenediamine tetraacetic acid sodium salt marketed by Ciba-Geigy as a 30% aqueous solution.
[b]An 87 to 89 mole % hydrolyzed PVOH marketed by Air Products and Chemicals, Inc..

The pH of the above charge was adjusted between 4.0 and 4.5 with acetic acid.

The vessel contents were agitated at 200 rpm and purged three times with ethylene (25 psig). Vinyl chloride monomer (240 g) was then added and the reactor was heated to 55° C. and pressurized with ethylene (875 psig). The agitation was increased to 900 rpm and 7 ml of 10% aqueous solution of erythorbic acid (pH 4.5) was pumped into the reactor. After the temperature and pressure had been equilibrated, the polymerization was initiated with a 1% aqueous hydrogen peroxide solution. After the rate of polymerization began to decrease (substantially all the vinyl chloride had polymerized with ethylene), the remaining vinyl chloride monomer (1,415 g) was added over a 4 hr period maintaining the polymerization temperature of 55° C. using approximately 1.2 g hydrogen peroxide as a 1% solution and 2.7 g erythorbic acid as the activator. Additional oxidant and reductant were used after the vinyl chloride monomer had been added to complete polymerization. A total of 1.67 g hydrogen peroxide as a 1% solution and 5.0 g erythorbic acid were used for the entire polymerization. The ethylene pressure was allowed to "float" during the polymerization without makeup or withdrawal. The emulsion was transferred to a degasser and the unreacted vinyl chloride monomer reduced to less than 10 ppm by the addition of vinyl acetate (15 g) followed by t-butyl hydroperoxide (4 g) and erythorbic acid (3 g), ferrous ammonium sulfate (0.2 g) and sequestrine 30A (0.8 g) in water (50 g). The vinyl chloride-ethylene copolymer of Run 1 was 83 wt% vinyl chloride, 17 wt% ethylene and had a Tg of about 30° C. Emulsion solids were about 55%.

Table 1 shows the amounts of the various monomers and other polymerization components for Runs 2-26 as well as physical data for the resulting emulsions.

In general, for runs 2-26 the above procedure was modified as follows:

The polymerization was initiated at 52° C. and the desired ethylene pressure, usually 875 psig to afford a copolymer having a Tg of about 20° to 35° C. and suitable for can coating formulations. Upon initiation by the addition of the oxidant ($H_2O_2$) at a fixed rate, the temperature of the polymerization reaction mixture was allowed to rise to 55° C. where it was maintained automatically by the heat exchange function of the reaction vessel jacket as is well known in the art. Concomitantly, the pressure would rise, for example from 875 psig to almost 950 psig. The jacket temperature began to drop after initiation and, usually, after about one half hour would reach a minimum, namely about 40° C. In approximately 5 to 10 minutes the jacket temperature usually began to rise corresponding to the time when the rate of polymerization began to decrease. When the jacket temperature approached 45° to 50° C., the amount of oxidant consumed was recorded and the vinyl chloride delay commenced. Again, this initial, or prepolymerization, step avoids the build up of excess unreacted vinyl chloride monomer in the sealed reaction vessel and reduces the possibility of the ethylene vessel pressure approaching the upper pressure limitation of the vessel. If the vinyl chloride monomer delay were commenced at polymerization initiation, an amount of cooling ability, which may be in excess of that of the reactor, would be required to permit reaction of sufficient vinyl chloride and ethylene monomer so as to prevent excessive pressure rise which could exceed the limits of the vessel. Typical plant reactors are not designed to withstand such conditions.

In those Runs in which a terpolymer was made, the olefinically unsaturated comonomer was added in the delay mode upon initiation of the polymerization reaction.

TABLE 1

| RUN | 1 | 2 | 3 | 4 | 5 | 6 | 7 | 8 | 9 | 10 | 11 |
|---|---|---|---|---|---|---|---|---|---|---|---|
| VINYL CHLORIDE | 83 | 83 | 83 | 81 | 78 | 80 | 85 | 81 | 83 | 78 | 81 |
| ETHYLENE | 17 | 17 | 17 | 19 | 21 | 20 | 15 | 19 | 17 | 22 | 18 |
| COMONOMER (%) | — | 3% AAm | — | — | — | — | — | — | — | — | 1% AA |
| POLYVINYL ALCOHOL (%) | 5 | SLS | 5 | 5 | 6 | 6 | 6 | 10 | 10-1 | 10-1 | 5 |
| REDOX SYSTEM | $H_2O_2$ EA | $NH_4S_2O_4$ SFS | $NH_4S_2O_4$ SFS | $H_2O_2$ EA | | | (SAME FOR RUNS 4-11) | | | | |
| ACCELERATED SEDIMENTATION (%) | — | — | — | 8 | 6 | 7 | 4 | 1 | 2 | 1 | 6 |
| Tg (°C.) | 30 | 30 | 27 | 21.5 | 22.5 | 29 | 34 | 34 | 33.5 | 25 | 26.5 |
| SOLIDS (wt %) | — | 50 | 55 | 55 | 46 | 51 | 52 | 50 | 51.5 | 49 | 52 |
| DRY FILM | | | | | | | | | | | |
| PENCIL HARDNESS | — | 2H | 5H | 4H | 5H | 5H | 5H | 4H | 4H | 5H | 4H |
| MEK RUBS | — | 6 | 3 | 3 | 1 | 2 | 4 | 3 | 3 | 1 | 3 |
| BOILING WATER (2 min) | | | | | | | | | | | |
| BLUSH RESISTANCE | — | 7 | 6 | 8+ | 9 | 9 | 7 | 9+ | 9 | 7+ | 9+ |
| AL ADHESION | — | 0 | 9 | 10 | 10 | 10 | 10 | 10 | 10 | 10 | 10 |
| PENCIL HARDNESS | — | 5B | 4B | H | 2B | — | B | H | H | H | 2B |
| WATER SOAK | | | | | | | | | | | |
| BLUSH RESISTANCE | — | 10 | 10 | 10 | 10 | 10 | 10 | 10 | 10 | 10 | 10 |
| PENCIL HARDNESS | — | B | HB | 4H | 2H | 4H | F | HB | 5H | 3H | 3H |

| RUN | 12 | 13 | 14 | 15 | 16 | 17 | 18 | 19 |
|---|---|---|---|---|---|---|---|---|
| VINYL CHLORIDE | 93 | 85 | 80 | 78 | 78 | 77 | — | 79 |
| ETHYLENE | 6 | 15 | | | | | | |
| COMONOMER (%) | 1% AA | 1% AA | 2% AA | 3% AA | 1% AA | 3% AA | 3% AA | 1% AAm |
| POLYVINYL ALCOHOL (%) | 5 | 5 | 5 | 5 | 6 | 6 | 6 | 5 |
| REDOX SYSTEM | $H_2O_2$ EA | EA | EA | (SAME FOR RUNS 12-19) | | | | |
| ACCELERATED SEDIMENTATION (%) | 3.5 | 15 | 10 | 20 | 1 | 1 | — | 9 |
| Tg (°C.) | 25 | 30 | 23 | 27.5 | 25.5 | 34 | — | 27.5 |
| SOLIDS (wt %) | 52 | 49 | 53.7 | 53 | 49.5 | 49 | — | 53 |
| DRY FILM | | | | | | | | |
| PENCIL HARDNESS | 4H | 5H | 4H | 4H | 4H | 4H | 5H | 4H |
| MEK RUBS | 3 | 2 | 3 | 3 | 3 | 3 | 3 | 3 |
| BOILING WATER (2 min) | | | | | | | | |
| BLUSH RESISTANCE | 10 | 9 | 8+ | 7+ | 10 | 10 | 8 | 9+ |
| AL ADHESION | 10 | 10 | 10 | 8 | 10 | 10 | 10 | 10 |
| PENCIL HARDNESS | HB | F | 2B | 2B | HB | H | H | 2B |
| WATER SOAK | | | | | | | | |
| BLUSH RESISTANCE | 10 | 10 | 9+ | 10 | 10 | 10 | 10 | 10 |
| PENCIL HARDNESS | — | 5H | H | 3H | — | — | F | 3H |

| RUN | 20 | 21 | 22 | 23 | 24 | 25 | 26 |
|---|---|---|---|---|---|---|---|
| VINYL CHLORIDE | 81 | — | — | — | — | 74 | — |
| ETHYLENE | 18 | — | (750 psig) | (700 psig) | (650 psig) | 26 (1100 psig) | (1200 psig & make-up) |
| COMONOMER (%) | 1% N—i-BMA | — | — | — | — | — | — |
| POLYVINYL ALCOHOL (%) | 5 | 4.4 partial delay | 4 | 4 | 4 | 5 | |
| REDOX SYSTEM | $H_2O_2$ EA | | (SAME FOR RUNS 20-26 | | | | |
| ACCELERATED SEDIMENTATION (%) | 7 | Extremely gritty | 13 | 20 | 30 | 4 | Aborted |
| Tg (°C.) | 38.5 | discard | 26 | 29 | — | 6 | Pressure Rose |
| SOLIDS (wt %) | 45.6 | | — | — | — | 48 | >1400 psig |

TABLE 1-continued

| | |
|---|---|
| DRY FILM | |
| PENCIL HARDNESS | 5H |
| MEK RUBS | 20 |
| BOILING WATER (2 min) | |
| BLUSH RESISTANCE | 10 |
| AL ADHESION | 10 |
| PENCIL HARDNESS | 5H |
| WATER SOAK | |
| BLUSH RESISTANCE | 10 |
| PENCIL HARDNESS | 5H |

[1]Polyvinyl alcohol; DPn about 220
AA = acrylic acid
AAm = acrylamide
N—i-BMA = N—i-butoxymethylacrylamide
EA = erythorbic acid
SFS = sodium formaldehyde sulfoxylate
SLS = sodium lauryl sulfate The comparison of Run 2 with Run 3 shows the effect of polyvinyl alcohol in place of an ionic surfactant in the ethylene-vinyl chloride polymerization recipe. The dry film tensile hardness is improved and the adhesion of the film to aluminum is improved significantly as shown by its ability to withstand boiling water. When Run 3 was repeated using a salt-free system in Run 4 (erythorbic acid instead of sodium formaldehyde sulfoxylate as reductant), the blush resistance was improved and the hardness retention of the film after exposure to water was significantly better.

Runs 5-7 demonstrate the effect of increasing the polyvinyl alcohol content to about 6 wt%. An improvement in blush resistance was attained over Run 3. A slight improvement in blush resistance was obtained in Run 8 by the addition of 4 wt% more polyvinyl alcohol to a 10% total polyvinyl alcohol level.

Runs 11-15 show the effect of adding one, two and three percent acrylic acid to a five percent polyvinyl alcohol containing ethylene-vinyl chloride polymerization recipe. Here the blush resistance and the hardness of the film has been improved. Runs 16-18 show the effect of increasing the polyvinyl alcohol content to 6 wt% at one and three percent acrylic acid levels. Outstanding blush resistance and improvement in boiling water film hardness were demonstrated.

Runs 19 and 20 show the five percent polyvinyl alcohol stabilized vinyl chloride-ethylene copolymers also comprising a nitrogen-containing monomer, namely acylamide and N-isobutoxymethylacrylamide, respectively. Run 19 showed good blush resistance and Run 20 showed excellent blush resistance and hardness. In addition, a substantial improvement in MEK rubs was obtained in Run 20 due to the self-crosslinking nature of N-isobutoxymethylacrylamide.

Run 21 used a partial delay of polyvinyl alcohol to the polymerization recipe. Initially 15% (0.66 g) of the total polyvinyl alcohol (4.4 g) was added prior to initiation and the remainder added by delay addition to the reaction mixture with the vinyl chloride monomer. A suspension-type polymer was obtained (extremely gritty). This Run demonstrates the need for at least 3 wt%, preferably 4 wt%, polyvinyl alcohol in the reaction medium when forming the prepolymer.

Runs 22-24 were performed at ethylene pressure of 750, 700 and 650 psig, respectively, without ethylene makeup and yielded product which, although low in grits, showed unacceptably high unaccelerated sedimentation values. The maximum acceptable accelerated sedimentation was set as 10%. These Runs show that with no ethylene make up, ethylene pressures of greater than about 750 psig are required to provide the stable vinyl chloride-ethylene copolymer emulsion according to the procedure set forth for Run 2.

Runs 25 and 26 showed that 1100 psig and no ethylene make up provided an acceptable emulsion even though a large amount of redox system was used, while 1200 psig and make up ethylene resulted in aborting the run due to uncontrollable pressure rise.

EXAMPLE 2

In this example several vinyl chloride-ethylene-acrylic acid copolymer emulsions from Example 1 were tested with and without external cross-linkers as films deposited by a #8 wire rod onto aluminum panels and cured for 10 minutes at 380° F. The resultant data are set forth in Table 2. It is apparent from the data that combining the polyvinyl alcohol/vinyl chloride-ethylene copolymers of the invention with cross-linking agents provide a container coating formulation which can deposit a resin film having good water resistance and hardness.

TABLE 2

| EMULSION RUN | 2 | 2 | 3 | 3 | 9 | 9 | 11 | 11 | 11 |
|---|---|---|---|---|---|---|---|---|---|
| CROSS-LINKER | — | 10% | — | 10% | — | 10% | — | 10% | 10% |
| (% solids/solids) | | CYMEL 303 | | CYMEL 303 | | CYMEL 303 | | DER 732 | CYMEL 303 |
| pH | — | 4.3 | — | 4.6 | — | 8.0 | 5.3 | — | — |
| DRY FILM | | | | | | | | | |
| PENCIL HARDNESS | 2H | 5H | 5H | 5H | 4H | 5H | 4H | 4H | 5H |
| MEK DBL RUB | 6 | 10 | 3 | 4 | 3 | 17 | 3 | 3 | 3 |
| BOILING WATER | | | | | | | | | |
| BLUSH RESISTANCE (2 min) | 7 | — | 6 | — | 9 | 10 | 9+ | 8 | — |
| BLUSH RESISTANCE (30 min) | — | 1 | 0 | 0 | 8 | 10 | 9 | — | 7 |
| AL ADHESION (2 min) | 0 | — | 9 | — | 10 | — | 10 | 9+ | — |
| AL ADHESION (30 min) | — | 10 | 10 | 0 | 10 | 10 | 10 | — | 4 |
| PENCIL HARDNESS (2 min) | 5B | — | 4B | — | 5H | — | 2B | 4B | — |
| PENCIL HARDNESS (30 min) | — | 4B | 6B | 5B | H | 3H | F | — | 3B |

TABLE 2-continued

| 24 HOUR SOAK (ACID/WATER) | | | | | | | | | |
|---|---|---|---|---|---|---|---|---|---|
| BLUSH RESISTANCE (ACID) | — | 10 | — | 5 | 10 | 10 | 10 | — | 10 |
| BLUSH RESISTANCE (WATER) | 10 | 10 | 10 | 10 | 10 | 10 | 10 | 10 | — |
| AL ADHESION (ACID) | — | 7 | — | 10 | 6 | 10 | 10 | — | 10 |
| AL ADHESION (WATER) | — | 4 | — | 10 | 10 | 10 | 10 | 9 | — |
| PENCIL HARDNESS (ACID) | — | B | — | F | 3H | 4H | H | — | 2H |
| PENCIL HARDNESS (WATER) | B | B | HB | H | 5H | 4H | 3H | HB | — |

| EMULSION RUN | 11 | 11 | 12 | 12 | 15 | 15 | 15 | 15 |
|---|---|---|---|---|---|---|---|---|
| CROSS-LINKER (% solids/solids) | 10% CYMEL 303 MC | 10% RESIMENE 730 | — | 10% CYMEL 303 | — | 10% CYMEL 303 | — | 10% RESIMENE 730 |
| pH | — | — | — | — | 5.8 | — | 5.8 | 5.7 |
| DRY FILM | | | | | | | | |
| PENCIL HARDNESS | 5H | 5H | 4H | 4H | 4H | 5H | 5H | 5H |
| MEK DBL RUB | 10 | 3 | 3 | 4 | 3 | 20 | 3 | 12 |
| BOILING WATER | | | | | | | | |
| BLUSH RESISTANCE (2 min) | — | — | 10 | — | 7+ | — | 8 | 6 |
| BLUSH RESISTANCE (30 min) | 9 | 6 | 10 | 9 | 6 | 10 | — | — |
| AL ADHESION (2 min) | — | — | — | — | 8 | — | 10 | 6 |
| AL ADHESION (30 min) | 10 | 7 | 10 | 10 | 10 | 10 | — | — |
| PENCIL HARDNESS (2 min) | — | — | — | — | 2B | — | HB | 5B |
| PENCIL HARDNESS (30 min) | 2B | 6B | H | F | 4B | H | — | — |
| 24 HOUR SOAK (ACID/WATER) | | | | | | | | |
| BLUSH RESISTANCE (ACID) | 10 | — | 10 | 10 | 9 | 10 | — | — |
| BLUSH RESISTANCE (WATER) | — | — | 10 | 10 | 10 | 10 | 10 | 10 |
| AL ADHESION (ACID) | 10 | — | 10 | 10 | 5 | 10 | — | — |
| AL ADHESION (WATER) | — | — | 10 | 10 | 10 | 10 | 10 | 7 |
| PENCIL HARDNESS (ACID) | 4H | — | H | H | 5B | H | — | — |
| PENCIL HARDNESS (WATER) | — | — | 4H | 3H | 3H | 4H | H | 3B |

| EMULSION RUN | 15 | 16 | 17 | 17 | 19 | 19 |
|---|---|---|---|---|---|---|
| CROSS-LINKER (% solids/solids) | 5% DER 732 | — | — | 10% CYMEL 303 MC | — | 10% CYMEL 303 |
| pH | 4.7 | — | — | — | — | 4.6 |
| DRY FILM | | | | | | |
| PENCIL HARDNESS | 5H | 4H | 4H | 5H | 4H | 5H |
| MEK DBL RUB | 2 | 3 | 3 | 18 | 3 | 3 |
| BOILING WATER | | | | | | |
| BLUSH RESISTANCE (2 min) | 10 | 10 | 10 | 10 | 9+ | — |
| BLUSH RESISTANCE (30 min) | — | 10 | 10 | 10 | — | 4 |
| AL ADHESION (2 min) | 10 | — | 10 | — | 10 | — |
| AL ADHESION (30 min) | — | 10 | 10 | 10 | — | 10 |
| PENCIL HARDNESS (2 min) | 4B | — | H | — | 2B | — |
| PENCIL HARDNESS (30 min) | — | HB | H | H | — | H |
| 24 HOUR SOAK (ACID/WATER) | | | | | | |
| BLUSH RESISTANCE (ACID) | — | 10 | 10 | 10 | — | 10 |
| BLUSH RESISTANCE (WATER) | 10 | 10 | 10 | 10 | 10 | 10 |
| AL ADHESION (ACID) | — | 10 | 10 | 10 | — | 10 |
| AL ADHESION (WATER) | 10 | 10 | 10 | 10 | 10 | 10 |
| PENCIL HARDNESS (ACID) | — | H | — | 4H | — | 2H |
| PENCIL HARDNESS (WATER) | H | 4H | 3H | 5H | 3H | 4H |

DER 732 is a water based epoxy resin marketed by Dow Chemical.
CYMEL 303 is a melamine formaldehyde marketed by American Cyanamid.
RESIMENE 730 is a melamine formaldehyde marketed by Monsanto.
MC is methyl cellosolve.

EXAMPLE 3

In this example experimental runs for the preparation of vinyl chloride-ethylene copolymer emulsions set forth as Runs 27-36 in Table 3 were conducted using substantially the same procedure for preparing polyvinyl alcohol-stabilized vinyl chloride-ethylene copolymer emulsions as described under Example 1. The major difference was the emulsifying system and its mode of addition to the polymerization reaction medium. The emulsifying systems were among those taught in U.S. Pat. No. 3,689,447 as being functionally equivalent. Run 37 is a polyvinyl alcohol/vinyl chloride-ethylene copolymer emulsion according to the present invention.

TABLE 3

| EMULSION | EMULSIFYING SYSTEM | MODE OF ADDITION | SEED | ETHYLENE PRESSURE | OXIDANT | REDUCTANT | % SOLIDS | GRITS 100 MESH | ACCELERATED SEDIMENTATION |
|---|---|---|---|---|---|---|---|---|---|
| 27 | SLS (3%) | Batch | Yes | 900 | $H_2O_2$ | EA | run coagulated | | |
| 28 | SLS (3%) | Batch | Yes | 900 | APS | SFS | run coagulated | | |
| 29 | DS-10 (3%) | Batch | Yes | 900 | APS | SFS | run coagulated | | |
| 30 | DS-10 (3%) | Delay | No | 850 | APS | SFS | run coagulated | | |
| 31 | POLYSTEP B-27 (3%) | Delay | No | 850 | APS | SFS | run coagulated | | |

TABLE 3-continued

| EMUL-SION | EMULSIFYING SYSTEM | MODE OF ADDITION | SEED | ETHYLENE PRESSURE | OXIDANT | REDUC-TANT | % SOLIDS | GRITS 100 MESH | ACCEL-ERATED SEDIMEN-TATION |
|---|---|---|---|---|---|---|---|---|---|
| 32 | Nat. 250LR (2%) Igepal CO 990 (0.5%) | Nat. 250LR-Batch Igepal CO 990-Delay | No | 850 | APS | SFS | run coagulated | | |
| 33 | Nat. 250LR (2%) SLS (0.5%) | Nat. 250LR-Batch SLS-Delay | No | 900 | $H_2O_2$ | EA | 46.8 | 74 | 0.7 |
| 34 | Nat. 250LR (2%) SLS (0.5%) | Nat. 250LR-Batch SLS-Delay | No | 900 | APS | SFS | 51.7 | 1470 | 2.1 |
| 35 | SLS (2.0) | Delay | No | 800 | APS | SFS | 50 | lg. amt. | 0.1 |
| 36 | Nat. 250LR (2.0%) Igepal CO 990 (1.5%) | Nat. 250LR-Batch Igepal CO 990 Delay | No | 900 | APS | SFS | 48 | 79 | 1.0 |
| 37 | Vinol 205 (6%) | Batch | Yes | | $H_2O_2$ | EA | | | |

SLS - sodium lauryl sulfate
DS-10 - dodecyl benzene sulfonate, sodium salt
Igepal CO-990 - nonyl phenoxy poly(ethyleneoxy)ethanol
Polystep B-27 - octyl phenoxy poly(ethyleneoxy)ethanol sulfate ester, sodium salt
SFS - sodium formaldehyde sulfoxylate
APS - ammonium persulfate
EA - erythorbic acid
Natrosol 250LR - hydroxyethyl cellulose As can be seen from Table 3, the indicated anionic, nonionic and colloid stabilizers were used alone and in combination in attempting to prepare stable vinyl chloride-ethylene copolymer emulsions. Each of the common techniques used in the art to prepare stable polymer emulsions were tried, i.e. the surfactants were batch-added all at once or delayed into the reaction medium along with emulsion seeding being used in several runs.

Runs 27-31 using three different anionic surfactants, namely sodium lauryl sulfate, sodium dodecyl benzene sulfonate and the sodium salt of nonylphenoxy poly(ethyleneoxy)ethanol sulfate ester did not afford a stable emulsion product when added to the initial charge and a seed emulsion was prepared. Rather the reaction medium coagulated during the polymerization process. Likewise for Run 32 which used a surfactant system comprising hydroxyethyl cellulose and a nonylphenoxy(polyethoxy)ethanol. Each of the polymerization runs that coagulated was attempted several times with the same result.

However, four relatively stable vinyl chloride-ethylene copolymer emulsions were prepared. Runs 33, 34 and 36 which used stabilizer systems comprising a protective colloid (hydroxyethyl cellulose) and a nonionic or anionic surfactant successfully yielded an emulsion when the colloid was added all up front to the reaction medium and the surfactant was delayed in during the polymerization process. Runs 33 and 34 were identical except for the use of two different redox systems, namely hydrogen peroxide/erythorbic acid in Run 33 and ammonium persulfate/sodium formaldehyde sulfoxylate in the Run 34. These emulsions were suitable for can coating formulation testing.

Run 35 was prepared using sodium lauryl sulfate as the sole surfactant in a delay surfactant procedure and starting the vinyl chloride monomer delay shortly after polymerization initiation. Run 35 had a very large amount of grit and would not be sufficiently stable to be commercially acceptable. It was, nevertheless, tested in the can coating formulation.

TABLE 4

| | | EMULSION ONLY* | | | | | | FORMULATED EMULSION** | | | | | |
|---|---|---|---|---|---|---|---|---|---|---|---|---|---|
| | DRY FILM | BOILING WATER (2 min.) | | | 24 HOUR WATER SOAK | | | DRY FILM | BOILING WATER (2 min.) | | | 24 HOUR WATER SOAK | | |
| RUN | PENCIL | BLUSH | ADH. | pH | BLUSH | ADH. | pH | PENCIL | BLUSH | ADH. | pH | BLUSH | ADH. | pH |
| 33 | 2H | 6 | 0 | B | 8 | 0 | 2H | 2H | 7 | 10 | H | 10 | 10 | 2H |
| 34 | 2H | 1 | 0 | <2B | 7 | 0 | HB | 2H | 1 | 10 | B | 9 | 10 | 2H |
| 35 | F | 4 | 0 | 2B | 7 | — | HB | 2H | 1 | 2 | <2B | 4 | 0 | HB |
| 36 | H | 1 | 0 | <2B | 6 | 0 | <2B | 2H | 3 | 10 | HB | 10 | 10 | 2H |
| 37 | 2H | 8 | 0 | F | 8 | 0 | 2H | 4H | 9 | 10 | 2H | 10 | 10 | 2H |

*Dried 2 min. at 380° F. over aluminum
**Formulation:
Emulsion — 82 wt % solids or solids
Celanese 5003 Dispersion — 9 wt %
Cymel 303 malamine formaldehyde — 9 wt %
n-Butanol:Butyl Cellosolve — (1:1)
Benzene sulfonic acid salt — 4 wt % based on Cymel 303 solids
Formulation coating was baked 4 min at 380° F.
Pencil Hardness: H > F > B The emulsions of Runs 33-36 and the emulsion of Run 37 which was a 6% polyvinyl alcohol stabilized vinyl chloride-ethylene copolymer emulsion according to the invention made in a pilot plant reactor were evaluated, both as is and in a can coating formulation containing epoxy and melamine resins, for blushing, metal adhesion and tensile hardness after exposure to (1) boiling water for 2 min. and (2) a 24 hr. water soak. The results of the testing are set forth in Table 4.

The most critical test with regard to the water resistant property of the emulsion copolymer, both as is and in the can coating formulation, is the blush test. Blushing is an inherent characteristic of the polymer exposed to water. For the most part, such blushing of the copolymer cannot be reduced by can coating formulating. On the other hand, loss of adhesion to the aluminum substrate can be countered by appropriate formulating. The aluminum substrate used in the comparative runs of this Example 3 was a commercial aluminum substrate which is used in the can manufacturing industry as opposed to the aluminum substrate used with the tests in Example 2 which was a specially treated non-commercial substrate.

It can be seen from the data in Table 4 that the polyvinyl alcohol stabilized vinyl chloride-ethylene emulsion copolymer showed unexpectedly superior water resistance according to the sensitive blush test in boiling water and the water soak compared to vinyl chloride-ethylene emulsion copolymers stabilized with other protective colloids and surfactants. This superior water resistance is even more surprising in view of the fact that, according to the prior art, polyvinyl alcohol stabilized emulsion copolymers are notoriously water sensitive.

When films of the emulsion copolymers themselves were tested, the emulsions of Runs 34 and 36 which used the hydroxyethyl cellulose in combination with an anionic and nonionic surfactant, respectively, showed exceedingly poor water resistance. The emulsion of Run 35, using solely an anionic surfactant stabilizing system, showed very poor water resistance. The emulsion of Run 33, which used the same stabilizing system as the emulsion of Run 34 but used a nonionic redox system, demonstrated better water resistance according to the blush tests. However, it was still inferior to that of the polyvinyl alcohol stabilized emulsion of Run 37.

When the emulsions were formulated in a can coating composition and tested, the emulsions of Runs 34, 35 and 36 again showed poor blushing characteristics in boiling water compared to the emulsions of Runs 33 and 37. Again, in spite of the presence of polyvinyl alcohol in the copolymer emulsion, the water resistance of the can coating composition containing the emulsion of Run 37 was surprisingly superior to the other vinyl chloride-ethylene copolymer emulsions.

EXAMPLE 4

This Example 4 demonstrates that the use of a fully hydrolyzed polyvinyl alcohol in combination with a partially hydrolyzed polyvinyl alcohol did not result in stable polyvinyl alcohol/vinyl chloride-ethylene copolymer emulsions. Runs 38-41 used a combination of Vinol 107 fully hydrolyzed polyvinyl alcohol and Vinol 205 partially hydrolyzed polyvinyl alcohol and an erythorbic acid-hydrogen peroxide redox system generally following the procedure of Example 1. It can be seen from Table 5 that Runs 38-41 all yielded unsuitable product.

TABLE 5

| | Vinol 107* (wt %) | Vinol 205 (wt %) | Reaction Product |
|---|---|---|---|
| Run 38 | 4.15 | 5 | Extremely viscous and dilatant |
| Run 39 | 5 | 5 | Extremely viscous, dilatant gritty emulsion |
| Run 40 | 5 | 5 | Extremely gritty emulsion |
| Run 41 | 2.5 | 5 | Run aborted; extremely gritty emulsion |

*A 98 to 98.8 mole % hydrolyzed PVOH marketed by Air Products and Chemicals, Inc.

STATEMENT OF INDUSTRIAL APPLICATION

The stable polyvinyl alcohol/vinyl chloride-ethylene copolymer emulsions according to the invention are useful in container coating formulations in that they provide a polymer coating on a metal surface possessing enhanced water resistance, improved dry coating tensile hardness and improved adhesion of the coating to the surface even after exposure to water.

I claim:

1. A method for preparing a stable polyvinyl alcohol/vinyl chloride-ethylene copolymer emulsion which comprises a copolymer colloidally dispersed in an aqueous medium, the copolymer having a Tg from 0° to 50° C., consisting of ethylene and about 65 to 90 wt% vinyl chloride and prepared by emulsion polymerization of the monomers in the presence of an emulsifying system consisting essentially of about 3 to 15 wt% polyvinyl alcohol which is 70 to 91 mole% hydrolyzed, which method comprises
   (a) forming an aqueous emulsion reaction mixture containing substantially all the polyvinyl alcohol and a portion of the total vinyl chloride monomer,
   (b) pressurizing the reaction mixture with an ethylene pressure sufficient to provide the copolymer with the desired ethylene content,
   (c) initiating the reaction mixture by the addition of a free radical generating source and continuing polymerization until the rate of polymerization begins to decrease,
   (d) adding the remaining vinyl chloride over a period of time while continuing polymerization until the reaction is no longer self-sustaining, and
   (e) removing the unreacted ethylene and reducing the vinyl chloride free monomer content of the emulsion.

2. The method of claim 1 in which the copolymer has a Tg of about 20° to 50° C. the ethylene is neither withdrawn nor added during the polymerization.

3. The method of claim 1 in which at least 5% to no more than about 60% of the total vinyl chloride monomer is added in step (a).

4. The method of claim 3 in which step (d) is commenced 5 to 10 minutes after the rate of polymerization begins to decrease.

5. The method of claim 3 in which the vinyl chloride and ethylene are polymerized in the presence of about 4 to 10 wt% polyvinyl alcohol which is 85 to 89 mole% hydrolyzed.

6. The method of claim 5 in which the copolymer is about 75-80 wt% vinyl chloride and 20-25 wt% ethylene and the polyvinyl alcohol is 87 to 89 mole% hydrolyzed.

7. The method of claim 1 in which the polymerization is performed in a salt-free reaction medium.

8. The method of claim 7 in which the free radical generating source comprises hydrogen peroxide and ascorbic acid or erythorbic acid as the redox system.

9. A stable vinyl chloride based resin emulsion prepared according to the method of claim 1.

10. A stable vinyl chloride based resin emulsion prepared according to the method of claim 2.

11. A stable vinyl chloride based resin emulsion prepared according to the method of claim 3.

12. A stable vinyl chloride based resin emulsion prepared according to the method of claim 4.

13. A stable vinyl chloride based resin emulsion prepared according to the method of claim 5.

14. A stable vinyl chloride based resin emulsion prepared according to the method of claim 6.

15. A stable vinyl chloride based resin emulsion prepared according to the method of claim 7.

16. A stable vinyl chloride based resin emulsion prepared according to the method of claim 8.

* * * * *